United States Patent [19]

Goel

[11] Patent Number: 4,558,114

[45] Date of Patent: Dec. 10, 1985

[54] POLYMERS DERIVED FROM POLYISOCYANATES, BICYCLIC AMIDE ACETALS AND OXAZOLINES

[75] Inventor: Anil B. Goel, Worthington, Ohio

[73] Assignee: Ashland Oil, Inc., Ashland, Ky.

[21] Appl. No.: 693,953

[22] Filed: Jan. 23, 1985

[51] Int. Cl.[4] .............................................. C08G 18/38
[52] U.S. Cl. ...................................... 528/73; 521/158; 521/163; 521/166; 548/218
[58] Field of Search ......................... 528/73; 521/158; 548/218

[56] References Cited

U.S. PATENT DOCUMENTS

| | | | |
|---|---|---|---|
| 3,738,992 | 6/1973 | Frump | 548/218 |
| 3,773,730 | 11/1973 | Hunsucker | 548/218 |
| 3,824,164 | 7/1974 | Himies | 548/218 |
| 3,952,000 | 4/1976 | Sidi et al. | 548/218 |
| 4,101,527 | 7/1978 | Cunningham et al. | 528/73 |
| 4,277,353 | 7/1981 | Deen et al. | 548/218 |

FOREIGN PATENT DOCUMENTS 3235933  3/1975  Fed. Rep. of Germany.

Primary Examiner—Maurice J. Welsh
Attorney, Agent, or Firm—John F. Jones

[57] ABSTRACT

A process for preparing novel interpolymers from mixtures of a bicyclic amide acetal, an oxazoline and a polyisocyanate and the novel polymers produced are described.

19 Claims, No Drawings

POLYMERS DERIVED FROM POLYISOCYANATES, BICYCLIC AMIDE ACETALS AND OXAZOLINES

This invention relates to the process for production of novel polymers by the interaction of a polyisocyanate, a bicyclic amide acetal and an oxazoline, and to the tough, high-softening polymer products so produced.

Bicyclic amide acetals are relatively new materials. The preparation of some of the bicyclic amide acetals is more fully disclosed in the copending U.S. patent applications of Anil B. Goel, and of Anil B. Goel and Harvey J. Richards, respectively, filed as Ser. Nos. 641,238 and 641,242 on Aug. 16, 1984.

Both bicyclic amide acetals and oxazolines have been shown to react individually with isocyanates at slow rates [Feinhauer, *Synth*, 16(1971); *Leibigs Ann. Chem.*, 698, 167(1966)]. The interaction of bicyclic amide acetals, oxazolines and polyisocyanates to form useful polymers having good impact resistance and high heat distortion temperatures has not been previously described.

Although the properties of polymers obtained by reaction of oxazolines and bicyclic amide acetals individually with isocyanates have not been reported, our experimental results have shown these polymers to be brittle.

We have discovered that the addition of oxazolines to the reaction of bicyclic amide acetals with polyisocyanates or vice-versa, i.e., addition of bicyclic amide acetals to the reaction of oxazolines with polyisocyanates results in significant polymerization rate increase to produce novel polymers which have excellent physical properties including toughness and high heat distortion temperatures. The polymers of this invention are useful as coatings, adhesives, in reaction injection molding and in various polymer composites.

The oxazolines useful in this invention include those having either the Formulas I or II

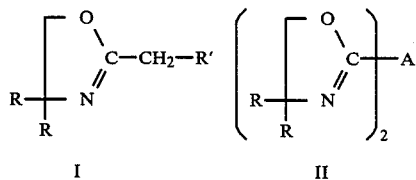

Wherein R and R' independently represent hydrogen or an alkyl group having from 1 to 18 carbon atoms, and A represents an alkylene group having from 1 to 20 carbon atoms.

The bicyclic amide acetals useful in this invention include those having the Formula III

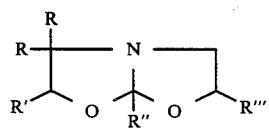

Wherein R, R' and R''' independently represent hydrogen or an alkyl group having from 1 to 18 carbon atoms, R''' also represents an alkyl ether, aryl ether or an alkaryl ether group having from 1 to 18 carbon atoms and R'' represents an alkyl group having from 1 to 18 carbon atoms or an alkaryl group having from 7 to 20 carbon atoms.

Polyisocyanates useful in this invention include organic isocyanates having at least two isocyanate groups per molecule. The polyisocyanates can be of low, high or intermediate molecular weight and can be of any of a wide variety of organic polyisocyanates including ethylene diisocyanate, trimethylene diisocyanate, dodecamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylene-1,4-diisocyanate, xylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two more fully disclosed in U.S. Pat. Nos. 3,350,362 and 3,382,215. Polyisocyanates which are polymeric in nature including isocyanate prepolymers of all types are included in this invention.

In addition to the essential bicyclic amide acetals, oxazolines and polyisocyanates, it is within the scope of this invention to include in the polymerization mixture polyols, polyepoxides, catalysts, etc. The polyols useful in this invention include those having at least two hydroxyl groups per molecule and having equivalent weights falling in the range of from about 20 to 5000. Specific polyols include butane diol, cyclohexane dimethanol, tripropylene glycol,

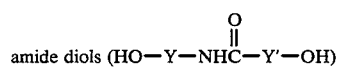

wherein Y and Y' are aryl or alkyl groups having from 2 to 20 carbon atoms,

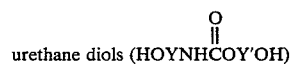

wherein Y and Y' have the earlier-described definitions, polyether polyols such as poly (tetramethylene ether) diols, poly(propylene ether) polyols, polyester polyols, and the like.

As polyols, the polyhydroxy polyethers are particularly suitable for this invention and preferably those having at least 2 hydroxyl groups per molecule. Polyhydroxy polyethers are readily prepared by polymerization of epoxides such as ethylene oxide, propylene oxide, butylene oxide, tetrahydro furan, styrene oxide, or epichlorohydrin either on their own or by chemical addition to other materials. Suitable other materials include ethylene glycol, propylene glycol, trimethylol propenes and 4,4'-dihydroxy diphenyl propane. Sucrose polyethers also may be used. Polybutadienes having hydroxyl groups as well as other known hydroxyl containing vinyl addition polymerized polymers can be used. Hydroxyl containing polyesters, polythioethers, polyacetals, polycarbonates or polyester amides of the types known for the formation of polyurethanes may also be used.

Particularly useful polyols for use in the present invention include the following representative aliphatic and aromatic polyhydric alcohols.

Aliphatic Polyhydric Alcohols ethylene glycol
propylene glycol
trimethylene glycol
triethylene glycol
pentaethylene glycol
polyethylene glycol
1,4-butanediol
diethylene glycol
dipropylene glycol
2,2-dimethyl-1,3-propane diol
hexa methylene glycol
1,4-cyclohexane dimethanol

Aromatic Polyhydric Alcohols xylene polyols
ethyl resorcinol
propyl resorcinol
2,4-dimethyl resorcinol
3,6-dimethyl-1,2,4-benzene triol
ethyl pyrogallol
2,4-methyl-1,4-dihydroxynaphthalene
dimethylol toluene
dimethylol xylene
bis-hydroxy ethyl or bis-hydroxy propyl ethers or resorcinol, catechol, or hydroquinones, 1,5-dihydroxy naphthalene, 4,4'-isopropylidene-bis-phenol, and the like.

The polymerization process of this invention is preferably carried out under substantially anhydrous conditions at temperatures falling in the range of from about room temperature up to 200° C. and at pressures in the range of from about atmospheric up to about 100 atmospheres.

This invention is further illustrated in the following representative Examples.

EXAMPLES 1-9

Examples 1 and 2 are outside the scope of the present invention. In each example the ingredients were mixed in a reactor at room temperature which was equipped with a thermocouple and the exotherm maximum and gel time was determined using as reactants the various bicyclic amide acetals (BAA), oxazolines and as polyisocyanate 4,4'-methylene bis(phenyl isocyanate) (MDI) as indicated in the following table. The bicyclic amide acetal (BAA) used in Examples 1-8 was one of Formula III in which R'' is methyl and R, R' and R''' are hydrogen. The BAA in Example 9 was one of Formula III in which R and R' are hydrogen, R'' is ethyl and R''' is CH$_2$OCH$_2$CH=CH$_2$. The oxazoline used in experiments 2-6 was one of Formula I in which R is hydrogen and R' is C$_{10}$H$_{21}$ and in Examples 7 and 9 R' is CH$_3$. In Example 8 the oxazoline was one of Formula II in which R is hydrogen and A is (CH$_2$)$_{10}$. The results obtained in Examples 1-9 are given in the following table.

TABLE

| Example | BAA (g) | Poly-isocyanate | Oxa-zoline | Exotherm Maximum Temp (°C.) | Gel Time (Minutes) |
|---|---|---|---|---|---|
| 1 | 4.8 | 10.7 g | 0 g | 195 | 38 |
| 2 | 0 | 7.3 | 6.4 | None | — |
| 3 | 3.2 | 7.9 | 0.6 | 155 | 2.25 |
| 4 | 2.4 | 7.2 | 1.6 | 150 | 2.4 |
| 5 | 3.0 | 10.0 | 3.0 | 136 | 2.75 |
| 6 | 1.6 | 9.0 | 4.8 | 80 | 7.0 |
| 7 | 6.5 | 17.5 | 1.0 | 190 | 3.0 |
| 8 | 3.3 | 11.8 | 2.1 | 180 | 2.25 |
| 9 | 5.3 | 10.2 | 1.0 | 180 | 2.9 |

These examples demonstrate that the addition of oxazolines to the bicyclic amide acetal and polyisocyanate result in significant improvement in reaction rates and that the reaction rates can be controlled by varying the relative proportions of reactants.

EXAMPLE 10

This example demonstrates the preparation of a polymer using only bicyclic amide acetal and polyisocyanate according to Example 1 and is outside the scope of this invention. A mixture of 65 g of the BAA and 216 g of the polyisocyanate of Example 1 was transferred to a parallel glass plate mold of ⅛ inch cavity. The mixture was cured in the mold for one hour at 100° C. followed by postcuring at 130° C. for two hours. The resulting clear sheet was brittle and was found to have a heat distortion temperature of 164° C., notched izod impact strength of 0.2 foot pounds/inch of notch and an unnotched izod impact strength of 4.5 foot pounds/inch.

EXAMPLE 11

The bicyclic amide acetal and polyisocyanate described in Example 10 were used in this example. The bicyclic amide acetal (32.5 g) and 32 g of undecyl-4,4-dimethyl-2-oxazoline were mixed and degassed under reduced pressure at room temperature. To this mixture was added 115 g of degassed polyisocyanate and the mixture was poured at once into the glass plate mold described in Example 10. The polymer sheet was cured and post-cured as described in Example 10. The resulting solid opaque polymer sheet was found to have a heat distortion temperature of 133° C., a notched izod impact strength of 0.64 foot pounds/inch of notch and an unnotched izod impact strength of 15.2 foot pounds/inch.

EXAMPLE 12

The materials described in Example 8 were used in this example. A clear casting was made in accordance with the procedure of Example 11 using a mixture of 21 g of the oxazoline, 33 g of the bicyclic amide acetal and 118 g of the polyisocyanate. The resulting cast polymer sheet was clear having a heat distortion temperature of 134° C. and a notched izod impact strength of 0.74 foot pounds/inch of notch.

EXAMPLE 13

A clear casting was prepared using the materials described in Example 7 by the procedure of Example 11. The mixture was composed of 65 g of the bicyclic amide acetal, 9 g of the oxazoline and 173 g of the polyisocyanate. The cured sheet was found to have a heat distortion temperature of 159° C., a notched izod impact strength of 0.35 foot pounds/inch of notch and an unnotched izod impact strength of 11 foot pounds/inch.

EXAMPLE 14

The procedure of Example 11 was followed using 48 g of methyl substituted bicyclic amide acetal, 10 g of 2-heptadecyl-4,4-dimethyl-2-oxazoline and 120 g of liquid 4,4'-methylene bis(phenyl isocyanate). A phase separation during the curing of the polymer was noticed to give a white opaque polymer. The physical properties of the polymer were found to be
NII = 1.0 ft.lbs/inch
UNI = 11.1 ft.lbs., HDT = 147° C.
Flexural Strength = 20,631 psi
Flexural Modulus = 407,791 psi

EXAMPLE 15

The procedure of Example 11 was followed using 33 g of bicyclic amide acetal, 20 g of 2-heptyl-4,4-dimethyl-2-oxazoline and 110.4 g of liquid MDI. The white opaque polymer was found to have NII = 0.81 ft.lbs/inch, UNI = 5.3 ft.lbs/inch, flexural strength = 13,402 psi and flexural modulus = 357,144 psi and HDT = 131° C.

EXAMPLE 16

The procedure of Example 11 was followed using 39 g of bicyclic amide acetal, 12.3 g of 2-(5-hydroxy pentyl)-4,4-dimethyl-2-oxazoline and 115 g of liquid MDI. The transparent polymer had NII = 0.4 ft. lbs/inch, UNI = 5.5 ft. lbs/inch, flexural strength = 25,117 psi and flexural modulus = 449,066 psi and HDT = 147° C.

EXAMPLE 17

The procedure of Example 11 was followed using 33 g of methyl bicyclic amide acetal, 10 g of 2-ethyl-2-oxazoline, 26 g of poly(tetramethylene ether) diol (eq. wt. = 492) and 115 g of liquid MDI. The yellow opaque polymer showed physical properties as NII = 0.92 ft.lbs/inch, UNI = 8.8 ft.lbs; flexural strength = 17,757 psi and flexural modulus = 333,178 psi and HDT = 150° C.

EXAMPLE 18

The procedure of Example 11 was followed using 10 g of bicyclic amide acetal III (R = Me, R' = H, R" = $C_{11}H_{23}$, R'" = $CH_2OC_4H_9$), 50 g of 2-ethyl-2-oxazoline, 0.2 g of tertiary amine catalyst and 164 g of liquid MDI. The mixture was cured for 1 hour each at 100° C., 130° C., 150° C., 185° C. The clear yellow polymer had NII = 0.2 ft.lbs/inch, and HDT = 200° C.

EXAMPLE 19

The procedure of Example 11 was followed using 33 g of methyl substituted BAA, 12.6 g of bis oxazoline [2,2'-tetramethylene bis-(4,4-dimethyl-2-oxazoline)] and 108 g of liquid MDI. The transparent polymer had NII = 0.4 ft. lbs/inch, UNI = 4.4 ft. lbs/inch, flexural strength = 25,026 psi, flexural modulus = 481,268 psi and HDT = 161° C.

EXAMPLE 20

The procedure of Example 11 was followed using 34 g of methyl substituted BAA, 12 g of 2-(5 hydroxy pentyl)-4-ethyl-4-hydroxy ethyl-2-oxazoline and 110 g of liquid MDI. The transparent polymer had NII = 0.35 ft. lbs/inch, UNI = 5.5 ft. lbs/inch, flexural strength = 22,242 psi, flexural modulus = 416,225 psi and HDT = 155° C.

EXAMPLE 21

The procedure of Example 11 was repeated using 48 g of methyl substituted bicyclic amide acetal, 10 g of 2-heptadecyl-4,4-dimethyl-2-oxazoline, 20.5 g of diglycedyl ester of dimeric linoleic acid and 130.5 g of liquid MDI. The polymer was white opaque with NII = 0.63 ft.lbs/inch, UNI = 10.8 ft.lbs/inch, flexural strength = 17,027 psi, flexural modulus 354,670 psi and HDT = 154° C.

EXAMPLE 22

The procedure of Example 11 was repeated using 48 g of methyl bicyclic amide acetal, 18.5 g of an oxazoline which was the reaction product of oleic acid with 2-amino-2-ethyl-1,3-propane diol and 128 g of liquid MDI. The polymer had notched izod impact strength of 0.61 ft.lbs/inch and heat distortion temperature of 138° C.

I claim:

1. The process for preparing a tough, high-softening polymer comprising interpolymerizing a bicyclic amide acetal, an oxazoline and a polyisocyanate at a temperature in the range of from about room temperature up to about 200° C. and at a pressure in the range of from about atmospheric up to about 100 atmospheres.

2. The process of claim 1 wherein the bicyclic amide acetal is one having the formula

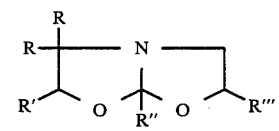

Wherein R, R' and R'" independently represent hydrogen or an alkyl group having from 1 to 18 carbon atoms, R'" also represents an alkyl ether, an aryl ether or an alkaryl ether group having from 1 to 18 carbon atoms and R" represents an alkyl group having from 1 to 18 carbon atoms or an alkyl group having from 7 to 20 carbon atoms.

3. The process of claim 2 wherein the oxazoline has the Formula I or II

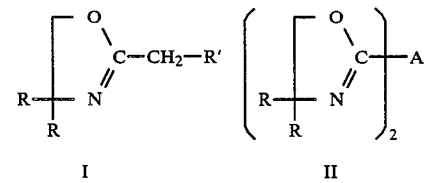

Wherein R and R' independently represent hydrogen or an alkyl group having from 1 to 18 carbon atoms and A represents an alkylene group having from 1 to 20 carbon atoms.

4. The polymer produced by the process of claim 1.

5. The process of claim 3 wherein the polyisocyanate is 4,4'-methylene bis(phenyl isocyanate).

6. The process of claim 3 wherein the bicyclic amide acetal is one of Formula III wherein R, R' and R'" are hydrogen and R" is methyl.

7. The process of claim 3 wherein the bicyclic amide acetal is one of Formula III wherein R and R' are hydrogen, R" is ethyl and R'" is $CH_2OCH_2CH=CH_3$.

8. The process of claim 3 wherein the bicyclic amide acetal is one of Formula III wherein R is methyl, R' is hydrogen, R" is $C_{11}H_{23}$ and R'" is $CH_2OC_4H_9$.

9. The process of claim 3 wherein the oxazoline is one of Formula I in which R is hydrogen and R' is $C_{10}H_{21}$.

10. The process of claim 3 wherein the oxazoline is one of Formula I in which R is hydrogen and R' is $CH_3$.

11. The process of claim 3 wherein the oxazoline is one of Formula II wherein R is hydrogen and A is $(CH_2)_{10}$.

12. The process of claim 3 wherein the oxazoline is undecyl-4,4-dimethyl-2-oxazoline.

13. The process of claim 3 wherein the oxazoline is 2-heptadecyl-4,4-dimethyl-2-oxazoline.

14. The process of claim 3 wherein the oxazoline is 2-heptyl-4,4-dimethyl-2-oxazoline.

15. The process of claim 3 wherein the oxazoline is 2-(5-hydroxypentyl)-4,4-dimethyl-2-oxazoline. of claim 3 wherein the oxazoline.

16. The process of claim 3 wherein the oxazoline is 2-ethyl-2-oxazoline.

17. The process of claim 3 wherein the oxazoline is [2,2'-tetramethylene bis-(4,4-dimethyl-2-oxazoline)].

18. The process of claim 3 wherein the oxazoline is 2-(5-hydroxy pentyl)-4-ethyl-4-hydroxyethyl-2-oxazoline.

19. The process of claim 3 wherein the oxazoline is one resulting from reaction of oleic acid and 2-amino-2-ethyl-1,3-propane diol.

* * * * *